United States Patent [19]

Bhattacharyya et al.

[11] 4,337,666

[45] Jul. 6, 1982

[54] METHOD AND APPARATUS FOR MEASURING THE EXPANSION OF A MAT OF FIBROUS MATERIAL

[75] Inventors: Rabindra K. Bhattacharyya, Granville; James S. Belt, Utica, both of Ohio

[73] Assignee: Owens-Corning Fiberglas Corporation, Toledo, Ohio

[21] Appl. No.: 164,465

[22] Filed: Jun. 30, 1980

[51] Int. Cl.³ .......................................... G01N 19/00
[52] U.S. Cl. ................................ 73/818; 33/172 E
[58] Field of Search ............. 73/818, 172, 806, 818; 33/169 R, 169 B, 172 E, 1 BB

[56] References Cited

U.S. PATENT DOCUMENTS

| | | | |
|---|---|---|---|
| 2,154,561 | 4/1939 | Breer et al. | 73/172 X |
| 2,703,492 | 3/1955 | Brissette et al. | 73/818 |
| 2,913,899 | 11/1959 | Wohler | 73/818 |
| 3,334,517 | 8/1967 | Janapol | 73/806 |
| 4,140,008 | 2/1979 | Golembeck et al. | 73/806 X |

FOREIGN PATENT DOCUMENTS 1119562 12/1961 Fed. Rep. of Germany ........ 73/823

*Primary Examiner*—William D. Martin, Jr.
*Attorney, Agent, or Firm*—Ronald C. Hudgens; Philip R. Cloutier; Ted C. Gillespie

[57] ABSTRACT

A method and apparatus for measuring the expansion of a mat of fibrous material in which a contact plate is periodically moved vertically into and out of contact with the surface of a mat of fibrous material, contact between the contact plate and the surface of the mat is sensed, and the position of the contact plate is recorded responsive to the occurrence of contact between the contact plate and the surface of the mat.

6 Claims, 2 Drawing Figures

METHOD AND APPARATUS FOR MEASURING THE EXPANSION OF A MAT OF FIBROUS MATERIAL

TECHNICAL FIELD

This invention relates to measuring the expansion of a mat of fibrous mineral material, such as insulating blankets, rolls or batts. In one of its more specific aspects, this invention relates to periodically contacting the surface of an expanding mat of mineral fibers, such as an insulation mat of glass fibers, in order to measure the expansion of the mat.

BACKGROUND OF THE INVENTION

A common practice in the packaging of insulation mats of fibrous mineral material is to compress the insulation material to a small fraction of its former size, and then package the compressed material in a bag or a roll form. It is important that when the package of insulation material is opened and the insulation material is released from compression, that the material expand to a predetermined thickness. Accordingly, it is a common practice in the manufacture of insulation materials to periodically select and open sample insulation packages in order to assess the expansion of the insulation mat. The measurement of the thickness, and hence the expansion, of the samples is accomplished using a tool known as a pin gauge or depth gauge. The pin gauge is a calibrated rod or stick upon which a disc is slideably mounted. Use of the pin gauge involves placing the stick into the insulation mat until the stick penetrates the mat through to the floor or work surface, and then sliding the disc down to the surface of the mat. Upon removal of the stick from the mat, a measurement of the thickness of the mat can be read from the stick. The method of measuring the thickness of mats with a pin gauge is described in ASTM Standard C 167-64.

One of the problems in measuring the expansion of insulation samples with the pin gauge is that it is burdensome to take repeated measurements of the thickness of the sample over the 24 to 30 hour time period required for such measurements. Another significant problem with pin gauge measuring is the inconsistency of measurements taken by different users. The subjectivity involved in using the pin gauge can result in different measurements of the same insulation material by different operators. The method and apparatus of the invention are directed towards the solution of the above problems.

SUMMARY OF THE INVENTION

According to this invention, there is provided apparatus for measuring the expansion of a mat of fibrous material in which a contact plate is mounted for movement along a line into and out of contact with the surface of the mat, a load cell is adapted to sense contact between the contact plate and the surface, means responsive to the sensing of the contact between the contact plate and the surface is provided to sense the position of the contact plate along the line, and means is provided for repeatedly moving the contact plate into and out of contact with the surface.

In a specific embodiment of the invention, the line is a vertical line.

In another embodiment of the invention, the means for sensing the position of the contact plate is a potentiometer.

In another embodiment of the invention, the contact plate is mounted for horizontal movement for contact with the surface at a plurality of loci on the surface.

In another embodiment of the invention, two or more contact plates are mounted for vertical movement to contact the surface at horizontally, spaced-apart loci.

According to this invention, there is also provided a method for measuring the expansion of a mat of fibrous material in which a contact plate is periodically moved along a line into and out of contact with the surface of the mat, contact between the contact plate and the surface is sensed with a load cell, and the position of the contact plate along the line is sensed in response to the sensing of contact between the contact plate and the surface.

In a specific embodiment of the invention, the line is a vertical line.

In another embodiment of the invention, the position of the contact plate is sensed by a potentiometer.

In another embodiment of the invention, the contact plate is periodically moved horizontally for contact with the surface at a plurality of loci on the surface.

In another embodiment of the invention, two or more contact plates are periodically moved vertically into and out of contact with the surface.

DESCRIPTION OF THE INVENTION

Figure 2:
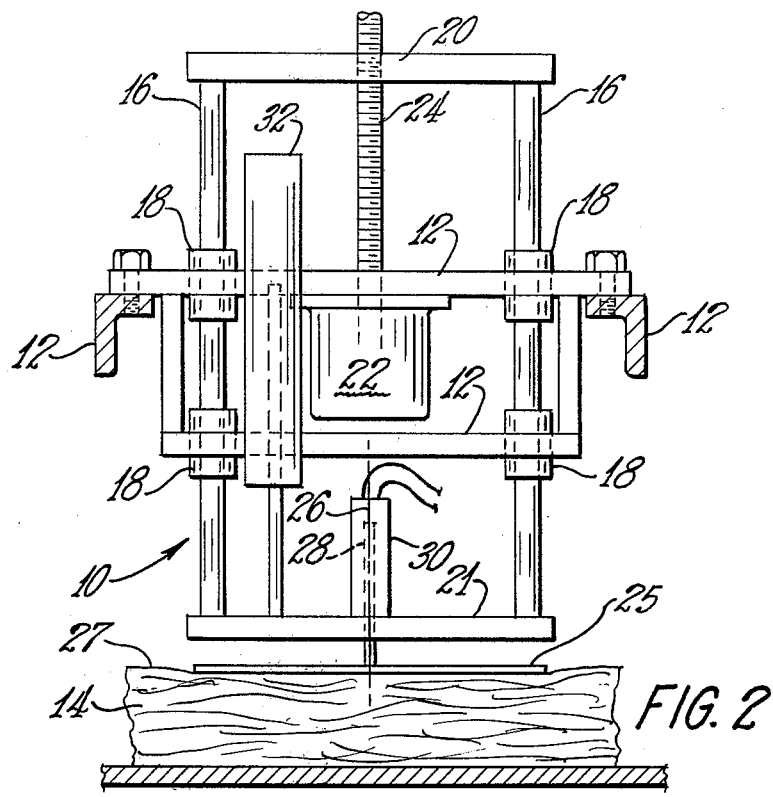
FIG. 2 is a schematic view in elevation of the measuring apparatus shown in FIG. 1.
Figure 1:
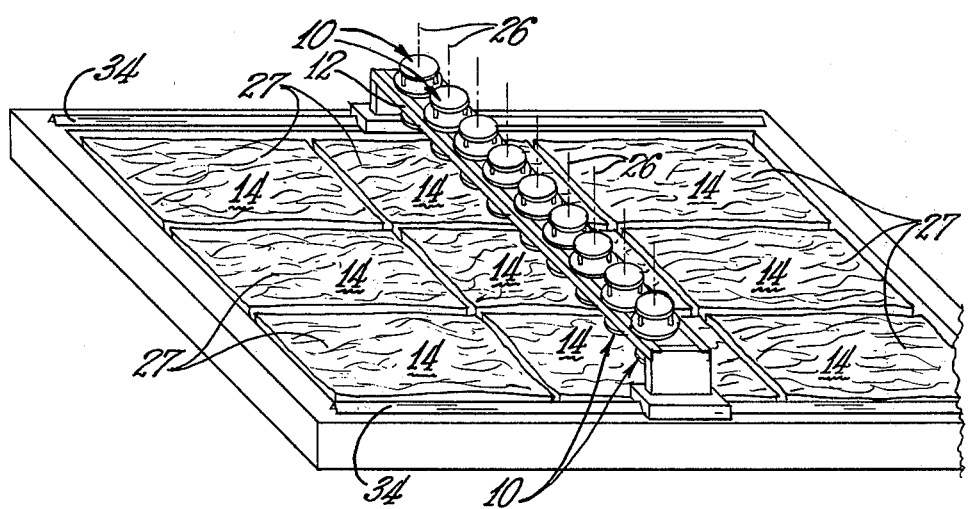
FIG. 1 is a schematic view in perspective of the apparatus for measuring expansion of a mat of fibrous material according to the principles of this invention.

As shown in FIGS. 1 and 2, the sensing apparatus 10 can be mounted on cross member 12 and thereby be positioned adjacent the mat, such as glass fiber insulation mat pieces 14. Shafts 16 can be slideably mounted through the cross member by means of cross member bushings 18. The shafts can be tied together by top and bottom nut plates 20 and 21. Means for periodically raising and lowering the shafts and nut plates, such as synchronous stepping motor 22, can be mounted on the cross member. The motor can be adapted with lead screw 24 passing through the top nut plate to drive the sensing apparatus up and down. A motor suitable for purposes of the invention is the Superior Electric Co. stepping motor, Model No. M061.

Contact plate 25 can be mounted on the bottom nut plate for vertical movement therewith along vertical line 26 to come into contact with surface 27 of the insulation mats. The contact plate can be a generally flat plate of any suitable size, such as a three inch diameter plate, which is the approximate size of the disc used in the pin gauge thickness measuring apparatus. The contact plate can be mounted on shaft 28 which can be connected to load cell 30 to gauge the force imparted to the contact plate by contact with the surface of the mats. Any suitable means for measuring force imparted to the contact plate can be used. It has been found that load cell Model UC3, manufactured by Gould Inc., of Oxnard, California, is suitable. Downward movement of the contact plate causes contact between it and the insulation sample, and the force is transmitted via the contact plate shaft to the load cell. The load cell can be calibrated so that a predetermined force by the contact plate shaft on the load cell triggers an indication that contact with the surface of the insulation sample has been made. Each time the contact plate is lowered into contact with the insulation sample the contact plate shaft will apply a force to the load cell, and the occurrence of contact between the contact plate and the insulation sample will be sensed by the load cell. This sensing is done repeatedly as the contact plate moves periodically up and down, into and out of contact with the surface of the insulation sample. The occurrence of contact is sensed in an objective manner because the load cell responds only to the predetermined loading or force provided by the contact plate. As the insulation mat expands, the contact plate will be higher along the vertical line at the occurance of contact with the surface of the mat.

Means activated by the sensing of the contact between the contact plate and the insulation mat, such as potentiometer 32, is adapted to measure the position of the contact plate at the occurrence of contact with the insulation mat. Any suitable means for measuring the position of the contact plate upon the occurrence of contact will be sufficient. It has been found that a position placement transducer Model No. PT-101-15-A, manufactured by Celesco Industries, Inc., is suitable. Each occurrence of contact causes the potentiometer to indicate the position data point and, therefore, over a period of time the potentiometer will indicate the expansion of the insulation sample, since the position of the contact plate will be moving upwardly. The potentiometer can be connected in any suitable manner to any suitable data receiving device for recording the changing position of the contact plate as the insulation mat expands.

As shown in FIG. 1, the cross member can be adapted with more than one sensing apparatus, each one being positioned over a different locus on the surface of the insulation sample. Also, the cross member can be mounted for horizontal movement on suitable apparatus such as track 34, so that the reciprocating contact member will make contact with the insulation sample at more than one locus on the top surface of the insulation sample.

It is to be understood that the invention can be used to measure the horizontal expansion of mats of fibrous material as well as vertical expansion.

EXPLOITATION IN INDUSTRY

This invention will be found to be useful in the measuring of the expansion of thermal and acoustical insulation products, such as insulation mats of glass fibers.

We claim:

1. The method of measuring the expansion of a mat of fibrous material comprising:
    (a) moving a contact plate along a line into contact with the surface of the mat;
    (b) sensing contact between the contact plate and said surface with a load cell;
    (c) sensing the position of the contact plate along said line responsive to the sensing of contact between said contact plate and said surface;
    (d) moving said contact plate along said line out of contact with said surface; and
    (e) repeating the sequence of steps (a), (b), (c) and (d) during the expansion of said mat.

2. The method of claim 1 in which said line is a vertical line.

3. The method of claim 2 in which the position of the contact plate is sensed by a potentiometer.

4. The method of claim 3 comprising periodically moving said contact plate horizontally for contact with said surface at more than one locus thereon.

5. The method of claims 2 or 3 comprising periodically moving two or more contact plates vertically into and out of contact with said surface.

6. The method of measuring the expansion of a mat of mineral fibers comprising:
    (a) moving a contact plate in a vertical direction into contact with the surface of the mat;
    (b) sensing contact between said contact plate and said surface with a load cell;
    (c) sensing with a potentiometer the vertical position of said contact plate responsive to the sensing of contact between said contact plate and said surface;
    (d) moving said contact plate vertically out of contact with said surface; and
    (e) repeating the sequence of steps (a), (b), (c) and (d) during the expansion of said mat.

* * * * *